United States Patent [19]

Van Doren

[11] Patent Number: 4,997,311
[45] Date of Patent: Mar. 5, 1991

[54] ARTIFICIAL REEF

[76] Inventor: David A. Van Doren, 3305 Country La., Hays, Kans. 67601

[21] Appl. No.: 415,878

[22] Filed: Oct. 2, 1989

[51] Int. Cl.$^5$ .......................... A01K 61/00; E02B 3/00
[52] U.S. Cl. ...................... 405/30; 405/205; 119/2; 52/80
[58] Field of Search .................. 405/21, 22, 25, 29, 405/30, 31, 32, 33, 34, 35, 195, 203, 205; 52/2 N, 80; 119/3, 2

[56] References Cited

U.S. PATENT DOCUMENTS

| 3,719,048 | 3/1973 | Arne et al. | 405/205 |
| 3,824,942 | 7/1974 | Stefford et al. | 405/210 |
| 4,004,429 | 1/1977 | Mouton | 405/195 X |
| 4,405,258 | 9/1983 | O'Rourke et al. | 405/203 X |
| 4,736,708 | 4/1988 | Yoder | 119/2 |

FOREIGN PATENT DOCUMENTS

| 2033191 | 5/1980 | United Kingdom | 119/2 |
| 875645 | 9/1987 | World Int. Prop. O. | 405/30 |

Primary Examiner—Randolph A. Reese
Assistant Examiner—Arlen L. Olsen
Attorney, Agent, or Firm—D. A. N. Chase

[57] ABSTRACT

An artificial reef of lightweight construction employs a dome-shaped, thin-walled enclosure of plastic material having apertures therein to permit acquatic life to enter and exit. The enclosure has a circular perimeter that is provided with a circumferential trough integrally formed with the enclosure. At a staging area adjacent the installation site, concrete ballast is poured into the trough to form a perimetrical weight which holds the reef in position on the desired underwater surface. The construction allows the reef to be installed from the surface of the water by releasing it over the site and permitting it to parachute downwardly through the water until it comes to rest.

8 Claims, 2 Drawing Sheets

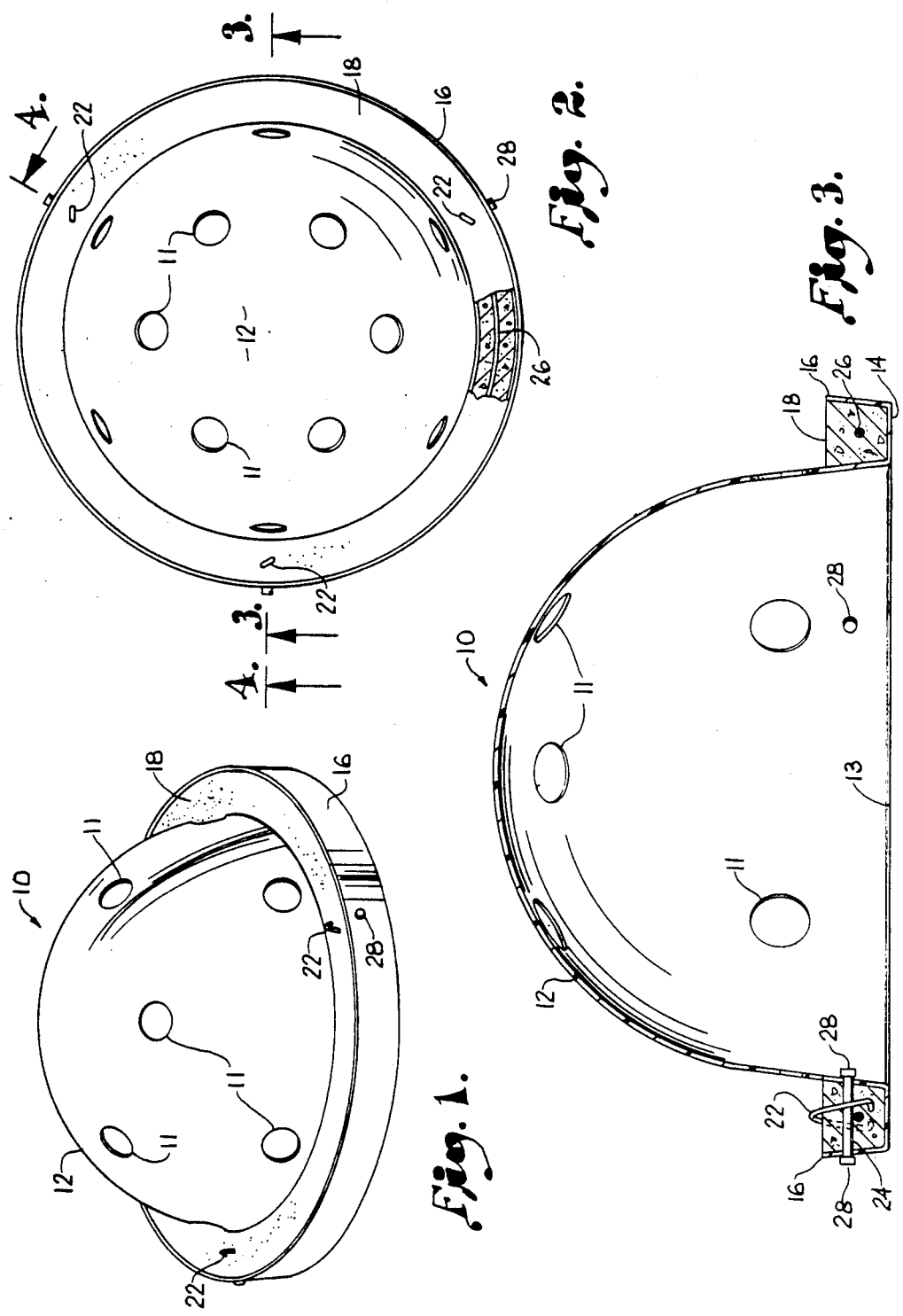

ARTIFICIAL REEF

This invention relates to an improved artificial reef assembly which enhances aquatic habitat for fish and mobile shellfish and which is easily transported and installed. More particularly, the present invention is concerned with an artificial reef assembly comprising a plastic dome-shaped enclosure having holes therein to allow the aquatic life to enter and exit, and a perimeter ballast for maintaining the reef in position on a desired underwater surface.

Artificial reefs of lightweight construction have heretofore been proposed, but these previous designs typically all require a diver to position the reef and then install earth anchors so the reef maintains its position. Therefore, although relatively easy to transport to the site, they are very labor intensive to install.

Some other previous artificial reef designs are made partially or entirely of concrete and thus may be lowered from the water's surface into position. Although their installation is less labor intensive, they do not transport as easily to the site due to the weight of the pre-formed concrete. Therefore, concrete reefs are also expensive to install because of the heavy lifting equipment needed.

It is, therefore, a primary object of the present invention to provide an easily installed, economical artificial reef assembly which enhances the aquatic habitat of fish and mobile shellfish.

Another important object of the invention is to provide an artificial reef that is readily transported over land and water prior to installation.

Another important object of the invention is to provide an artificial reef that is readily transported over land and water prior to installation.

Still another important object is to provide an artificial reef that is easily installed without labor-intensive procedures, and which may be simply released over the site at the water's surface.

Yet another object of the present invention is to provide a dome-shaped artificial reef enclosure integrally connected to a trough extending circumferentially around the periphery of the enclosure and which, upon filling the trough with concrete ballast, may be parachuted through the water into position on the desired underwater surface.

SUMMARY OF THE INVENTION

In furtherance of the foregoing objects, the present invention comprises a dome-shaped, apertured enclosure having a circular periphery integrally connected to a U-shaped plastic base which forms a circumferential trough around the dome-shaped enclosure. At a location convenient to the installation site, concrete ballast is poured into the trough to form a perimetrical weight which secures the reef once it is positioned. After the concrete cures, the reef assembly is installed by suspending it over the water above the desired site by a small crane or a fork-lift operating from a barge. Once vertically aligned with the site, the reef is released and permitted to parachute downwardly through the water until it comes to rest on the desired underwater surface.

DESCRIPTION OF THE DRAWINGS

FIG. 1 is a perspective view of one form of the artificial reef construction assembly.

FIG. 2 is a top plan view of the structure shown in FIG. 1 with a portion broken away to show the deformed reinforcing bar inserted into the concrete.

FIG. 3 is a vertical cross-section on an enlarged scale taken along line 3—3 of FIG. 2.

DETAILED DESCRIPTION

Figure 4:
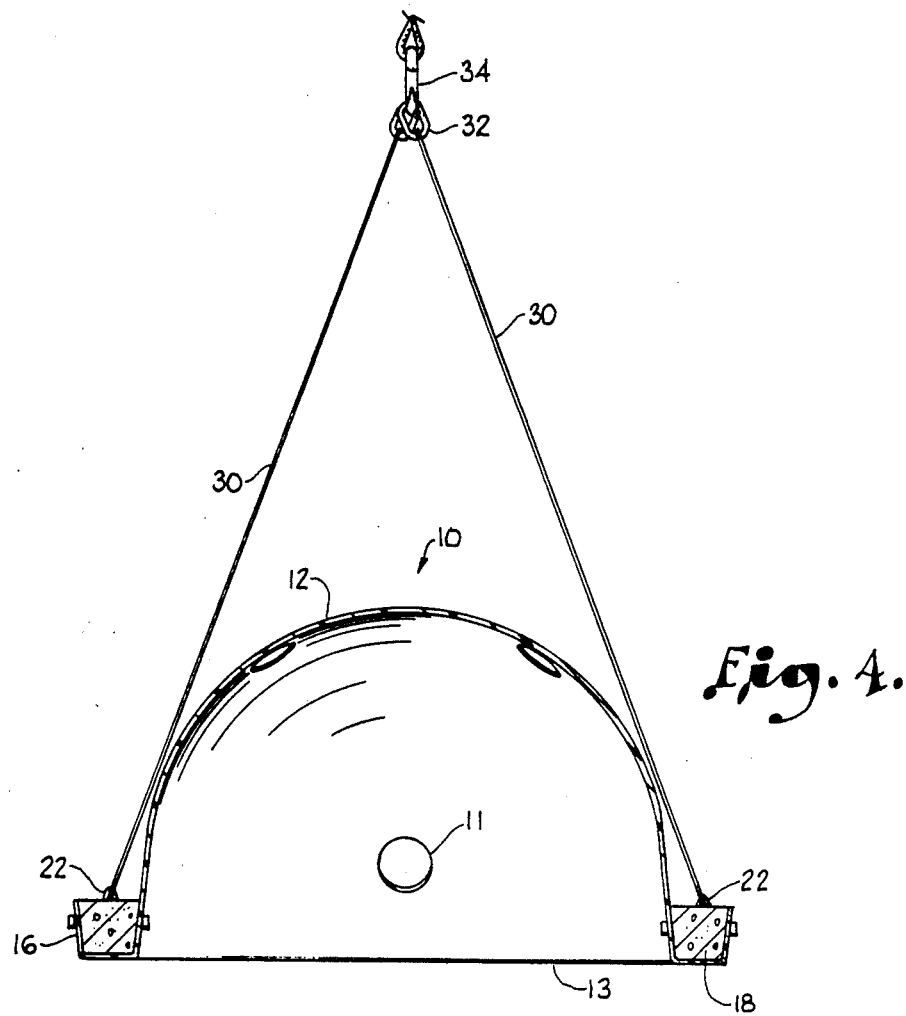
FIG. 4 is a rotated vertical cross-section taken along line 4—4 of FIG. 2 through two of the lifting eyes, and showing the suspension ropes used in installation.

A shell-like enclosure 10 in the preferred embodiment has a dome-shaped wall 12 and is formed from thermoformed, ultraviolet resistant plastic to present a wall thickness of approximately one-quarter inch (6.5 mm.). A black ABS or a high-density polyethylene is suitable. This provides a structure that is highly ultraviolet resistant and has an expected life span of at least 40 years. The wall 12 has a plurality of apertures 11 through which fish can enter and exit. The apertures 11 are arranged in two circular rows of six each around the wall 12 as shown in FIG. 1 and FIG. 2 and may vary in size. For instance, smaller apertures will exclude larger species of fish and, therefore, the enclosure 10 will provide protection for smaller species. Likewise, if the enclosure 10 is to be used to attract game fish, larger apertures are desirable.

The dome-shaped wall 12 presents a circular periphery 13 from which a base 14 extends radially outwardly and then upwardly to form an integral trough 16. This unit, the enclosure 10 comprising wall 12 and trough 16, is preferably 8½ feet in diameter and weighs approximately 200 pounds and thus may be easily transported over land and water. Furthermore, the units typically may stack or nest so many of them can be transported simultaneously. Up to 2,000 pounds of concrete ballast 18, poured throughout the trough 16 upon reaching a staging area adjacent the installation site, comprises a means of adding weight and completes the enclosure construction.

A suspension means provides easy on-site installation after the concrete ballast 18 has been poured into the trough 16. The suspension means is comprised of three steel lifting eyes 22 arranged at equal intervals around the enclosure 10 in the ballast 18. As shown in FIG. 3, each of the lifting eyes 22 is secured in the concrete ballast 18 by a PVC lock-on pipe 24 which extends across the trough and through the portion of the eye 22 within the concrete 18. In turn, the lock-on pipes 24 overlie a circular reinforcing bar 26 which continuously extends around the center of the ballast 18. In addition to being imbedded in the concrete, the pipes 24 are secured by PVC caps 28 on their ends. As shown in FIG. 4, a manila rope 30 is threaded through each lifting eye 22. Double rope is used to allow the use of smaller diameter rope. The ropes 30 converge at an apex above the enclosure 10 and are provided with eyes 32 on their ends that receive a release hook 34. In use, the enclosure 10 is placed in the water and released to parachute onto the desired surface 36. The manila rope 30 eventually degrades.

Figure 5:
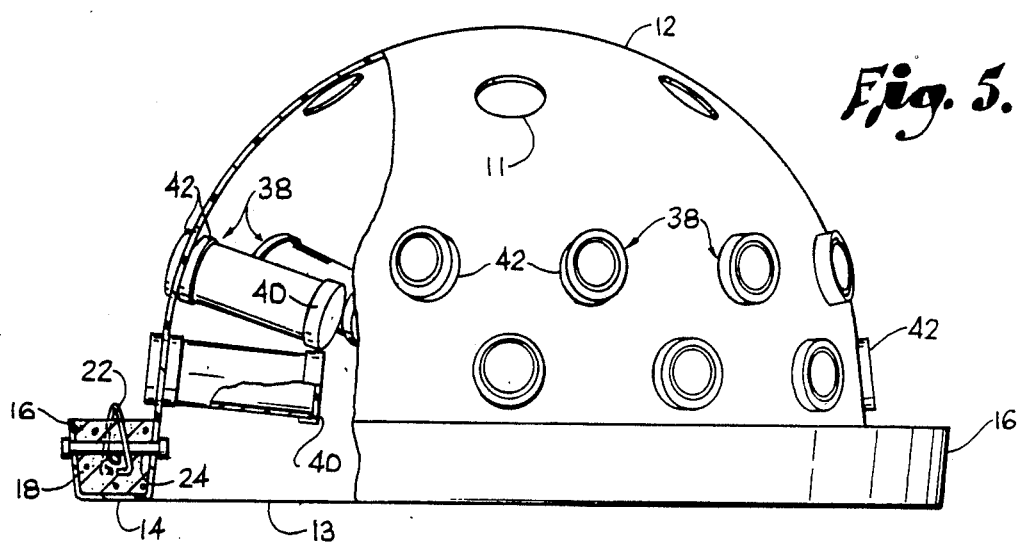
FIG. 5 is an elevational view of a modified form of the artificial reef assembly provided with shellfish habitats, portions being broken away to reveal details of construction.

As a modification of the preferred embodiment, a PVC plastic pipe approximately 1½ feet (0.46 m.) in length can be placed through any or all of the openings 11 in the enclosure 10 to provide a lobster habitat 38, as shown in FIG. 5. The inner end of each pipe 38 should be closed by a PVC plastic end cap 40, while the outer end, which communicates with the water, should be left open but secured to the wall of the enclosure 10 by PVC plastic collars 42.

The present invention is particularly adapted for use by political subdivisions and fishing clubs to minimize beach erosion at ocean sites and enhance the aquatic habitat. The reefs can be arranged in a variety of patterns as desired. For instance, they can be used to line beaches in rows or can be clustered at fishing sites in the ocean or fresh water lakes. The reef's size, shape and weight facilitate this type of use. They may be readily sized to comply with current trucking regulations allowing transport of items 8½ feet wide. Furthermore, one truck can transport several stacks of reef units since their shape permits them to nest. Finally, installation is made easier since the concrete can be poured adjacent the site, and the units parachuted into position without the need for subsurface anchoring. The concrete-weighted trough provides an annular footprint on the underwater surface which is itself sufficient to hold the reef unit in place.

Having thus described the invention, what is claimed as new and desired to be secured by Letters Patent is:

1. An artificial reef for enhancing aquatic habitat comprising:
    a hollow, relatively lightweight enclosure presenting a shell-like wall having a plurality of apertures therein to allow aquatic life to enter and exit the enclosure,
    said enclosure further having a perimeter presenting a base adapted for overlying engagement with an underwater supporting surface, and
    weight means on said base for maintaining said enclosure at a desired location on said surface, whereby to sink said enclosure and secure it in place,
    said base including a relatively lightweight trough projecting radially from said enclosure, receiving said weight means and extending around said perimeter to provide an annular footprint on said surface to hold the reef in place.

2. An artificial reef as recited in claim 1, wherein the wall is a relatively thin-walled plastic material.

3. An artificial reef as claimed in claim 1, wherein the enclosure is dome-shaped.

4. An artificial reef as claimed in claim 1, wherein said weight means extends around the enclosure within the trough.

5. An artificial reef as claimed in claim 4, wherein said weight means comprises concrete poured in said trough.

6. An artificial reef as claimed in claim 1, further comprising suspension means for movement of the reef over the desired location, whereby upon release of the suspension means the enclosure parachutes into place.

7. An artificial reef as claimed in claim 6, wherein said suspension means comprises:
    lifting eyes spaced around the weight means and degradable rope threaded through each lifting eye, whereby the ropes may converge to an apex for suspending the reef.

8. An artificial reef as claimed in claim 1, further comprising a number of elongated, tubular shellfish habitats, each extending through a corresponding aperture inwardly into the hollow of the enclosure and each having an open outer end communicating with the water and a closed inner end.

* * * * *